United States Patent [19]
Gelchinsky

[11] Patent Number: 5,103,429
[45] Date of Patent: Apr. 7, 1992

[54] HOMEOMORPHICAL IMAGING METHOD OF ANALYZING THE STRUCTURE OF A MEDIUM

[76] Inventor: Boris Gelchinsky, Mivtsa Yonathan 12/16, Kfar Saba, Israel

[21] Appl. No.: 600,362

[22] Filed: Oct. 19, 1990

[30] Foreign Application Priority Data

Oct. 27, 1989 [IL] Israel ......................................... 92132

[51] Int. Cl.$^5$ .............................................. G01V 1/36
[52] U.S. Cl. ..................................... 367/38; 367/50; 367/59
[58] Field of Search ................. 367/38, 50, 51, 61, 367/64, 74, 7, 9; 364/421

[56] References Cited

U.S. PATENT DOCUMENTS 4,878,205 10/1989 Gelchinsky ..................... 367/61

OTHER PUBLICATIONS

Keydar et al., "Common Evolute Element (CEE) Stack and Imaging (Zero Offset Stack)," Expanded Abstracts of SEG 60 Annual Meeting & Exposition, Sep.–Oct. 1990, San Francisco.

Gelchinsky, "Homeomorphic Imaging in Processing and Interpretactions of Seismic Data," Expanded Abstracts of SEG 59 Annual Internation Meeting & Exposition, Oct.–Nov. 1989, Dallas, Tex.

Primary Examiner—Ian J. Lobo
Attorney, Agent, or Firm—Benjamin J. Barish

[57] ABSTRACT

A method of analyzing the structure of a medium particularly useful in seismic prospecting, by generating seismic data represented by recorded traces corresponding to a plurality of source and receivers distributed according to a homeomorphic distribution with respect to predetermined central points in a manner providing predetermined parameters and one-to-one mapping of each element of a target object into an element of its homeomorphic image. A gather of corrected traces is formed and stacked to obtain stacked wavefield characteristics as functions of the time of registration of the data on a predetermined central trace. The stacked wavefield characteristics for a plurality of central traces, and the mentioned predetermined parameters, are then utilized for determining the structure of the medium.

24 Claims, 5 Drawing Sheets

HOMEOMORPHICAL IMAGING METHOD OF ANALYZING THE STRUCTURE OF A MEDIUM

BACKGROUND OF THE INVENTION

The present invention relates to a method of analyzing the structure of a medium. While the invention has a number of possible applications, including tomography or non-destructive testing of a body, it is particularly useful in seismic prospecting for determining the physical structure of the earth at any particular location, and is therefore described below with respect to this application.

It is generally accepted that the Common Middle Point (CMP) method, also sometimes called the Common Depth Point (CPD) method, of seismic prospecting has changed the philosophy, style and technique of reflection surveying in seismic prospecting and has caused drastic qualitative and quantitative improvements in seismic data interpretation. The crucial point of the CMP technique is a stack. However, it is well-known that a stack of observed data is usually accompanied by a loss of information (resolution) as compared to unstacked data. This is true for the CMP stack in all situations involving non-horizontally layered media and/or a dipping reflector.

Different methods (e.g., deep moveout and all its modifications) were proposed to eliminate, or at least to diminish, this undesirable property of stacking. However, the known methods generally have the drawback that it is necessary to know beforehand the velocity structure of the overburden and reflector dip. Determining the velocity structure with the required accuracy is extremely difficult in practice especially in case of complicated media.

It would therefore be very desirable to develop a method of data stacking which: (1) does not demand any prior knowledge of the parameters of the overburden structure, (2) results in collecting and enhancing useful waves, and (3) does not involve a loss of information concerning target objects.

A method meeting all the above three characteristics was proposed by the inventor in Israel Patent Application 83306 filed July 23, 1987, which corresponds to U.S. patent application Ser. No. 07/217,269 filed July 11, 1988, which issued as U.S. Pat. No. 4,878,205 on Oct. 31, 1989. The described method, called the CRE (Common Reflecting Element) method is distinguished from traditional data processing techniques primarily by the following two main characteristics: (1) the stacking of the studied traces of one gather should correpond to a special type of an asymmetrical non-uniform distribution (called a polynomial or binomial distribution) of corresponding source-receiver pairs; and (2) the stacked traces should be subjected to a particular type of time correction, called the Oblique Circle Correction (OSC), which depends only on local parameters of wavefronts with respect to the receivers and sources placed along a seismic line.

The CRE method does not use the velocity characteristics of the overburden, like the velocity in the well-known formula $\Delta t = \sqrt{t_o^2 + \Delta X^2 / V^{2-2}}$, or average velocity, or internal velocity. Both the polynomial distribution and the OSC (Oblique Spherical Correction) are applicable for two-dimensional overburdens of an arbitrary structure. Usually in practice the parameters of the distribution and the OSC are unknown. Therefore, a special procedure for a search of optimal values of such parameters is proposed using traces recorded in the field according to an arbitrary multi-fold system of observation.

It would appear at first glance that only the CRM method satisfies all three of the desirable characteristics set forth above. Actually, only one type of a source-receiver configuration, namely the polynomial distribution, corresponds to the CRP method, although approximatations could be obtained by some mathematical transformation of the polynomial distribution.

However, if this problem is more carefully studied, it becomes clear that many methods could satisfy all three of the above characteristic conditions, because of the following observations: In the CRE method, each point of a reflector (i.e., each of the CRP's) is uniquely mapped in one point of the corresponding image surface, and vice versa. This means that, from the mathematical point of view, a reflector and its CRE image are topologically equivalent. This property of the CRE mapping preserves the information concerning a mapped reflector by the CRE stack. In mathematics, it is well-known that a typologically equivalent mapping is not unique. Thus, generally speaking, there would be many types of typologically equivalent stacks.

OBJECTS AND BRIEF SUMMARY OF THE INVENTION

An object of the present invention is to provide a new method of analyzing the structure of a medium by means of body (as distinguished from the surface) waves. The body waves may be of any known type, i.e., direct, reflected, converted, defracted, scattered, refracted, etc. The novel method may be used in many diverse applications, including the tomographic or non-destructive testing of a body, but is particularly applicable in seismic prospecting.

According to the present invention, there is provided a method of analyzing the structure of a medium by means of body waves transmitted through the medium comprising:

(a) generating seismic data represented by recorded traces corresponding to a plurality of source and receivers distributed with respect to predetermined central points according to a homeomorphic distribution, namely a distribution which is necessary to produce a homeomorphic image, namely an image having a one-to-one correspondence between each element of the target and each element of its image;

(b) forming from said recorded traces a gather of corrected traces corresponding to chosen wavefield characteristics corrected according to a predetermined time delay which depends on local parameters of the medium and wavefronts in the areas of the locations of the sources and receivers and which is necessary to produce a homeomorphic image;

(c) stacking said corrected traces and obtaining stacked wavefield characteristics as functions of the time ($t_c$) of registration of the data on a predetermined central trace, corresponding to said central points;

(d) repeating steps (a) and (b), and determining sets of stacked wavefield characteristics for a plurality of central traces; and (e) utilizing said sets of stacked wavefield characteristics and said predetermined parameters for determining the structure of the medium.

In mathematics, homeomorphism is a one-to-one correspondence between the two points of geometric figures that is continuous in both directions.

It will thus be seen that the novel method is based on generating the stack of observed data in such a way that a target object and its image will be togologically equivalent, which means that each element of a target is one-to-one mapped with respect to each element of its image.

The invention of the present application is thus to be distinguished from that of my prior U.S. Pat. No. 4,878,205.

My prior patent is based on the concept that if the stack of recorded traces is performed in such a way that all events reflected from the target correspond to a common reflecting point, then the loss of resolution in producing the stack is not essential for studying the structure of the medium. From this concept, it follows that a binomial distribution of source-receiver paris is required, and also required is a special type of time-correction, called the Oblique Spherical Correction.

The present invention, however, is based on a different concept. According to the present invention, the stack of traces is done such that the image constructed with the parameters of the stack is topologically equivalent to the target. That is, there is a one-to-one correspondence between each point or element of the target and its image. The new concept of the present invention allows to produce many types of stacks and corresponding images constructed without loss of resolution. This new concept does not require a binomial distribution of the source-receiver pairs, nor the above-mentioned Oblique Spherical Correction factor.

The predetermined parameters of the distribution and time correction are preferably optimal parameters which provide the one-to-one mapping.

A homeomorphic image of a predetermined target (often called an original image) is not unique; that is, different types of homeomorphic images and corresponding stacks may be generated. Described below are several ways of generating both two-dimensional and three-dimensional homeomorphic stacks which involves the following three stages: (1) sorting of the recorded traces (2) their time delay correction with interpolation and formation of a gather of synthetic corrected traces and (3) transformation of the corrected traces into their respective stack.

If the sources and receivers are distributed in the field according to predetermined homeomorphic distributions with optimal parameters, then all three of the above stages could be performed, and optimally stacked wavefield characteristics (called time sections and optimal homeomorphic images) determined by te optimal parameters of the stack, could be produced. This scheme of homeomorphic imaging is called the direct scheme.

However, in many cases, especially in seismic prospecting, optimal values of the parameters are unknown, and therefore a homeomorphic distribution cannot be implements on the site. In these situations, only domains of possible values of optimal parameters may be estimated at the start, and corresponding sequences of grid values of the parameters may then be chosen. The sources and receivers may therefore by distributed in the field according to some arbitrary distribution, consisent with the expected homeomorphic types of distributions. This means that synthetic traces, corresponding to optimal homeomorphic distributions, can be generated from recorded traces by sorting and interpolation.

A scheme of homeomorphic imaging applied in this situation is called an inverse scheme and comprises additional stages. This scheme is formed in the following manner: first, predetermined combinations of fixed values of parameters from the sequences of grid values are chosen, and for these combinations the above-described "direct scheme" is implemented, with the following additional operations: (1) measurement of a coherence function of predetermined type for a gather of the synthetic traces; (2) varying the combinations for different grid values and determining a set of coherence values; (3) optimizing these values according to one of the known techniques of optimazation like the "steep-descent" or "Monte-Carlo" technique, etc.; (4) determining maximum values for the set of coherence functions and corresponding optimal values of the parameters and optimally-stacked wavefield characteristics for each moment of time ($t_c$) of recording on the prdetermined central traces; (5) repeating the sequence of operations for a plurality of central points, and obtaining sets of functions describing behaviour of maxima of coherence functions, optimal stacked time sections, and optimal parameters with respect to coordinates of central points ($X_c$) and time ($t_c$).

For each type of homeomorphic image there is dependence between optimal parameters and coordinates of corresponding image points. Thus, homeomorphic images could be determined as a function of the time $t_C$ and the coordinate $X_C$.

Different types of homeomorphisms and corresponding types of stacks could be produced with data recorded by a fixed system observation. In these cases, the described sequence of operations with the recorded data could be performed to produce other types of homeomorphic images and corresponding sets of time sections.

The data obtained by homeomorphic imaging may be utilized in the following manner. First, such data could be used for solving inverse problems. For example, optimal parameters could be used as inputs in different procedures for determination of a so-called "true model" of a studied medium. Optimal time sections could be used in migration procedures.

Another way of using data obtained by homeomorphic imaging is to combine different types of sound homeomorphic images, corresponding to their times sections and graphs of optimal parameters. For this purpose, auxiliary steps may be used, including plotting of the image sections and graphs, and selecting images belonging to the same object with the help of a special system of criteria-indicators. Such data may be also used for determining the type of the objects, e.g., reflector, defractor or scatterer.

Further features and advantages of the invention will be apparent from the description below.

BRIEF DESCRIPTION OF THE DRAWINGS

The invention is herein described, somewhat schematically and by way of example only, with reference to the accompanying drawings, wherein.

CRE (COMMON REFLECTOR ELEMENT) IMAGING TECHNIQUE

Figure 1A:
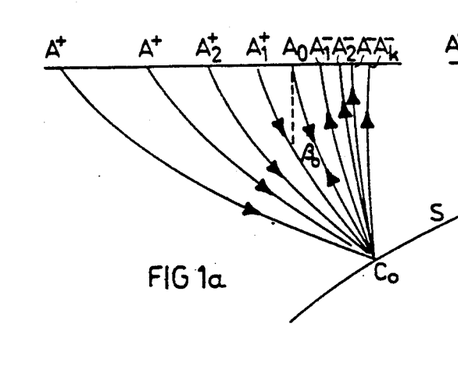
FIGS. 1a–1c are ray schemes illustrating the CRE imaging technique.
Figure 1B:
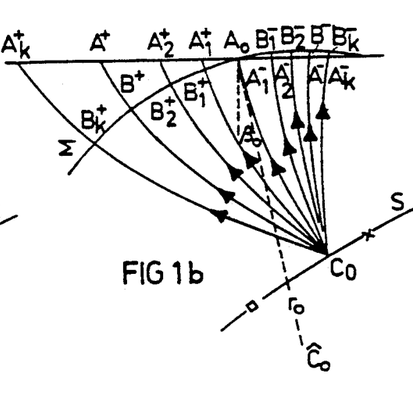
Figure 1C:
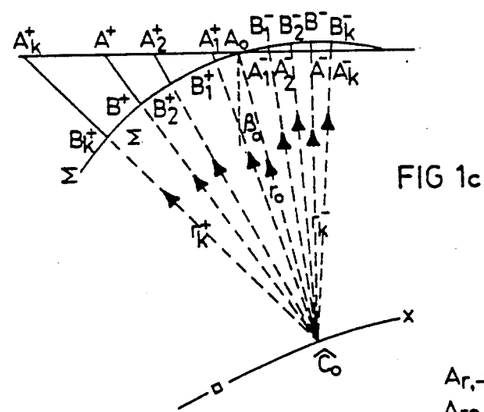

FIGS. 1a–1c are ray schemes illustrating the CRE imaging technique, more particularly described in the above-cited US patent. FIG. 1a is a ray scheme corresponding to the CRE distribution of source-receiver pairs; FIG. 1b is a ray scheme corresponding to the fictitious Snell's sources located at the Common Relecting Point (CRP); and FIG. 1c is a ray scheme corresponding to the image source located at the center of the front of a curvature.

More particularly, FIG. 1a illustrates the disposition of a source $A_k^+$ and a receiver $A_k^-$, corresponding to the k-th trace (k=0,1,2,3) and ray schemes for a wave, reflected from the interface S at the same specular point $C_o$ (CRP). One could associate with a problem of calculation of arrival times t $(A_k^+ C_o A_k^-)$ (k=0,1,2,3) for a reflected wave a problem of calculation of the pairs of the arrival times $t(C_o A_k^+)$ and $t(C_o A_k^-)$ of wave, emitted by a fictitious source, located at the CRP - the point $C_o$ on a reflector S, and coming to a couple of the connected points $A_k^+$ and $A_k^-$, placed on the free surface (FIG. 1b). The rule defining two connected points $A_k^+$ and $A_k^-$ is determined by a direction of a normal $\vec{N}$ at the CRP to the interface S and by Snell's law.

FIGS. 1b and 1c depict the front $\Sigma$ of a wave emitted by a fictitious source at the point $C_o$ and arriving at the central (zero-offset) point Ao in the half zero-time to/2. The wavefront could be approximately considered as a spherical one in some neighbourhood of the central point Ao. In this approximation, the central of wavefront curavature $\hat{C}_o$ could be regarded as an imaginary source in a homogeneous medium with the wave propagation velocity $v_o$ equal to the velocity near the free surface (reference level). The rays of wave of this imaginary source $\hat{C}_o$ to the point $A_k^+$ and $A_k^-$ are shown on FIG. 1c by the dotted lines. The segments of rays $B_k^+ A_k^+$ and $B_k^- A_k^-$ directed to the points $A_k^+$ and $A_k^-$ from the CRP and from the center of wavefront curvature $\hat{C}_o$, practically coincide.

Thus, the center of a front curvature - the point $\hat{C}_o$, could be regarded as some image of the fictitious point $C_o$, i.e., the image of the Common Reflecting Point. Repeating the presented procedure for a plurality of central points, one could obtain a deformed image $\hat{S}$ of the reflector S as a locus of centers of curvature of wavefronts emitted by a set of fictitious sources located on the S (FIG. 1c).

The next step is determination of expressions by dynamic correction. This step, as well as the subsequent steps, are described more particularly in the above-cited U.S. patent.

DESCRIPTION Of PREFERRED EMBODIMENTS

In order to illustrate general schemes of homeomorphic imaging, several specific methods of time correction and distributions of sources and receivers will now be described.

The MCRE (Modified Common Reflected Element) Method

Figure 2:
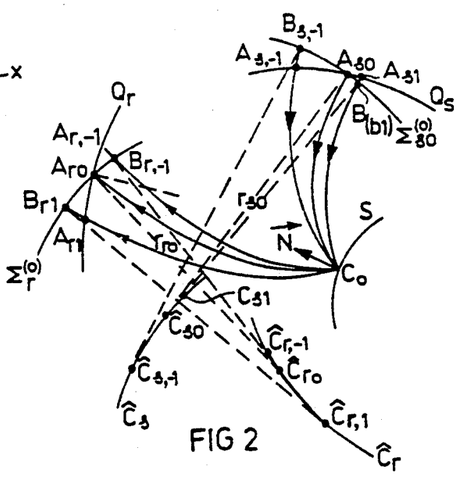
FIG. 2 is a ray scheme illustrating the MCRE imaging technique.

FIG. 2 is a ray scheme illustrating the MCRE imaging technique. In this figure $Q_s$ and $Q_r$ are source and receiver lines; $C_0$ is a CRP wherein Snell's fictitious sources are located; $\hat{C}_s$ and $\hat{C}_r$ are fictitious front caustics; and the points $\hat{C}_{so}$ and $\hat{C}_{ro}$ are images of the CRP.

More particularly, in this method the sources and receivers are distributed in an arbitrary manner along two different or coinciding lines $Q_1$ (e.g., source line $Q_s$) and $Q_2$ (e.g., receiver line $Q_2$). In the case of a two-dimensional medium (in two areas $Q_1$ and $Q_2$ in a three-dimensional medium). This ray scheme is constructed under conditions that all reflections or conversions take place at the Common Reflecting Point (CRP) at the Common Converting Point (CCP), as shown in FIG. 2. In this figure, the two fictitious fronts $\Sigma_s^{(o)}$ and $\Sigma_r^{(o)}$ emitted by a fictitious source, placed at the CRE point $C_0$ and corresponding to lines $Q_s$ and $Q_r$ are also shown. These fronts come to the central point $A_{so}$ and $A_{ro}$ under angles of entry $\beta_{so}$ and $\beta_{ro}$ having radii of curvature $r_{so}$ and $r_{ro}$. The two points $\hat{C}_{so}$ and $\hat{C}_{ro}$, located on the caustics $\hat{C}_s$ and $\hat{C}_r$ and corresponding to the central points $A_{so}$ and $A_{ro}$ of the lines $Q_s$ and $Q_r$, are determined as the two images of the CRP.

It follows from the consideration of the ray scheme illustated in FIG. 2 that a specific type of sources and receivers distributions are modififed two-dimensional binomial distributions:

$$\Delta X_k = y_k + a_1 y_k^2$$

$$\Delta Z_k = -\gamma y_k + \gamma^2 d_2 y_k^2$$

$$(k = 0, 1, \ldots, M - 1)$$

where:
$\Delta X_k = X_k - X_o$ is the distance from source $A_{Sk}(X_X)$ to the central point $A_{SO}(X_O)$;
$\Delta Z = Z_k - Z_o$ is the distance from receiver $A_{rk}(Z_k)$ to the central point $A_{ro}(Z_o)$;
$a_j$ (j=1,2) is a predetermined coefficient of asymmetry, called an asy-factor which could be presented in the case of a two-dimensional medium by the expression:

$$a_j = a_{oj} + \Delta a_j, \ a_{oj} = \sin \beta_{oj}/r_{oj}$$

(j=1,2)
where:

$\Delta\alpha_j$ is a predetermined correction coefficient of asymmetry (correction asy-factor), $\gamma$ is a predetermined coefficient, M is the number of seismic traces, and $y_n$ is an independent variable which takes values from a predetermined sequence of numbers (e.g., a set of discrete values $y_x = 0, 1, 2$).

Figures 3, 4A:
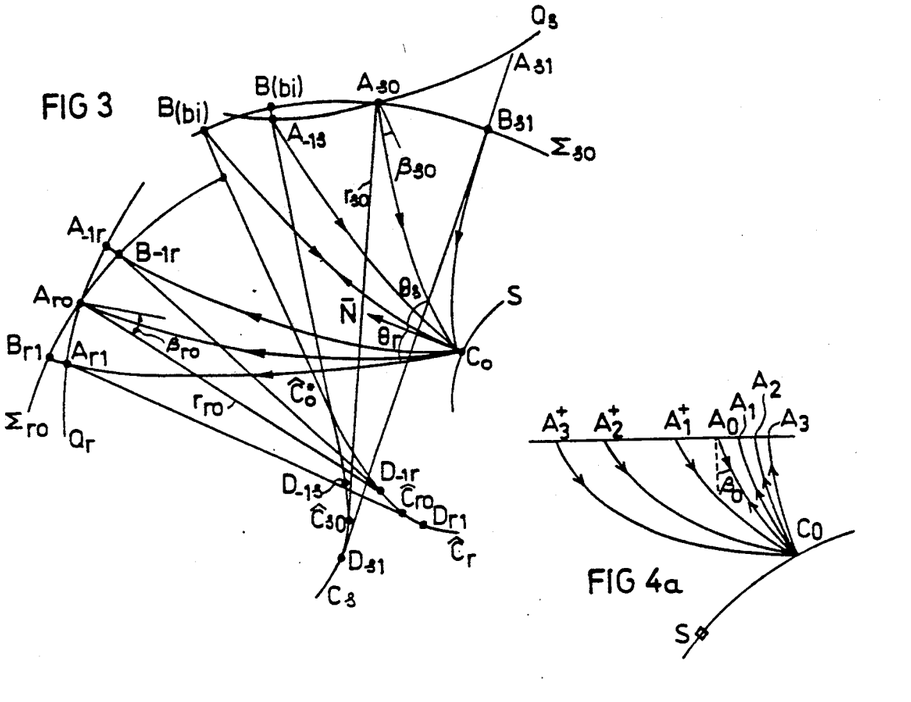
FIG. 3 is a ray scheme illustrating the MCRE imaging wherein one image is formed for two branches $\Sigma_{so}$ and $\Sigma_{ro}$ of a fictitious front.
FIGS. 4a–4c are ray schemes illustrating the CCE imaging techniques.

The proposed scheme of homeomorphic imaging by means of the fictitious sources, placed in the CRP in the case of the MCRE method, is associated with reflected events emitted by sources along line $Q_s$ and recorded by receivers placed along the line $Q_r$. It is easy to see from FIG. 2 (and also FIG. 3) that the time delay is determined by the equation:

$$\Delta\tau_k = \tau(A_{sk}C_oA_{rk}) - \tau(A_{so}C_oA_{ro}) =$$
$$= A_{sk}B_{sk}/V_{os} + A_{rk}B_{rk}/V_{or}$$

where: $V_{os}$ and $V_{or}$ have velocities of wave propagation near the lines $Q_s$ and $Q_s$, and $A_{sk}B_{sk}$ and $A_{rk}B_{rk}$ are segments; are equal for a pair of real rays $A_{sk}C_oA$ and $A_{so}C_oA_{ro}$ and for two pairs of frictions rays $C_oA_{sk}$ and $C_oA_{so}$; $C_oA_{rk}$ and $C_oA_{ro}$. It follows from consideration of FIGS. 2 and 3 that the lengths of segments $A_{sk}B_{sk}$ and $A_{rk}B_{rk}$ are determined as the differences $$\Delta r_{jk} = A_{jk}B_{jk} = \hat{C}_{jk}A_{jk} - \hat{C}_{jk}B_{jk} \quad (j = S \text{ or } r)$$

between radii of curvature of two positions at a moving fictitious (or real) front, corresponding to the same predetermined point $A_{jr}$ and the same points $\hat{C}_{jk}$ on its caustic $\hat{C}_j$. Using the following known fundamental property of a caustic, called an evolute in differential geometry:

$$\hat{C}_{jk}B_{jk} = \hat{C}_{jo}A_{jo} + \hat{C}_{jo}C_{jk} \quad (j = S \text{ or } r)$$

the following relationship for the time correction is obtained:

$$\Delta\tau_{jk} = (r_{jk} = r_{jo} + \Delta S_{ok})/V_{oj} \quad (j = S \text{ or } r)$$

where: $r_{jr}$ and $r_{jo}$ are radii of curvature of a fictitious (or real) wavefront reaching the predetermined point of observation $(A_{rk})$ or source $(A_{sk})$ and the related central point $(A_{jo})(j = S_o r P)$; $\Delta S_{ok}$ is the length of the caustic arc between centers of curvature $\hat{C}_{oj}$ and $\hat{C}_{jk}$, corresponding to said point $A_{jo}$ and $A_{jk}$.

The last relationship is written in such form that it is valid in a general case in any two-dimensional medium. For a three-dimensional medium, this relationship could be generalized and take a very cumbersome form. The equation for a three-dimensional medium in a case a relatively simple shape of surface formed by centers of curvature of the fictitious (or real) wavefronts will be written later.

If a type of caustic is fixed, the relation for time correction could be rewritten in a parametrical form. For example, if the caustic is a circular arc, then the following equation could be obtained:

$$p_j = 2\rho_j t_g \beta_j/2, \quad \beta_{jk} = r_{jo} + (X_{jk} - X_{jo})\sin\beta_{jo} \quad (j = S \text{ or } r)$$

$r_{jo}$ and $r_{jk}$ are radii of curvature of the front corresponding to a central point $A_{jo}$ and a predetermined point $A_{jk}$, $\beta_{oj}$ is the angle of entry at the point $A_{jo}$, $\rho_j$ is the radius of curvature of caustic $\hat{C}_j$ (FIG. 2). The quantity $\beta$ is defined as in increment of an angle $\beta_{jk}$ (X), i.e., $$\Delta\beta_{jk}(X_k) = \beta_j(A_{jo}) - \beta_j(A_{jk}) = \beta_{jo} - \beta_{jk}$$

which could be transformed to the form $$tg\Delta\beta_{jk} = \frac{\beta_{jk}[(X_{jk} - X_{jo})\cos\beta_{jo} - \rho_d] \pm \rho_j\sqrt{r_{jo}^2 + 2\rho_j(X_{jk} - X_{jo})\cos\beta_{jo}}}{\beta_{jk}^2 - \rho_j^2}.$$

For most interesting situations (a small angle), this relation may be simplified to the following form $$\Delta\beta_{jk} = \left[\sqrt{r_{jo}^2 + 2r_{jo}\sin\beta_{jo}(X_{jr} - X_{jo}) + (X_{jk} - X_{jo})^2} - r_{jo} + \frac{1}{2}\left(1 - \frac{\beta_{jk}}{r_{jo}}\right)\Delta\beta_{jk}\right]/V_{oj}$$

In a generated case, while a caustic $\hat{C}_j$ converges to a point and the front becomes spherical, a time correction may be determined by the following simple formula:

$$\Delta\tau_{jk} = (r_{jk} - r_o)/V_{jo} =$$
$$= \left(\sqrt{r_{jo}^2 + 2r_{jo}\sin\beta_{jo}\Delta X_{jk} + \Delta X_{jk}^2} - r_{jo}\right)/V_{jo}$$

which is used in the so-called Oblique Spherical Correction (OSC) in the Common Reflecting Element (CRE) method, as described in the above-cited U.S. patent for example. In this method, the two points $A_{so}$ and $A_{ro}$ coincide.

In a three-dimensional medium, a wavefront coming to a central point $A_{jo}$ is approximated as a paraboloid with the following characteristics: $\beta_{jo}$ is the angle of entry, $r_{j1}$ and $r_{j2}$ are radii of curvature of the first and second principal normal sections, and $\psi_j$ is the angle between a plane of incidence $E_H$ and the first principal section. Then a difference of times of arrival of the front $\Sigma_j$ at points $A_{jr}$ and $A_{jo}$ is determined by the relation $$\Delta\tau_{jk} = \frac{-1}{2V_{jo}} \cdot \left[\frac{2H_j}{K_j} - r_\gamma(\Delta X_{jk})\right] \pm$$

$$\Delta\tau_{jk} = \frac{\left(\sqrt{r_{jo}^2 + 2r_{jo}\sin\beta_{jo}(X_{jk} - X_{jo}) + (X_{jk} - X_{jo})^2 + \rho_j^2 + \rho_j\beta_{jk}} + \rho_j\left(\Delta\beta_{jk} - tg\frac{\beta_{jk}}{2}\right) - r_{jo}\right)}{V_{oj}}$$

where:

-continued $$\frac{1}{V_{jo}} \sqrt{\frac{1}{4}\left[\frac{2H_j}{K_j} - r_\gamma/(\Delta X_{jk})\right]^2 + \frac{r_\gamma(\Delta X_{jk}) - r_{\gamma o}}{K_j r_{\gamma o}}}$$

where: $K_j = 1/r_{j1}r_{j2}$ and $H_j = \frac{1}{2}\left(\frac{1}{r_{j1}} + \frac{1}{r_{j2}}\right)$ are the gaussian and average curvatures of the wavefront, $r_{\gamma o}$ and $r_\gamma (\Delta X_{jk})$ are radii of curvature of the wavefront normal section, which forms an angle with a plane of incidents $E_H$ at the point $A_{jo}$ and at the point $A_{jr}$. These radii are defined by the relation $$\frac{1}{r_{\gamma o}} = \frac{\cos^2(\psi_j - \gamma_j)}{r_{j1}} + \frac{\sin^2(\psi_j - \gamma_j)}{r_{j2}}$$

$$r_\gamma(\Delta X_{jk}) = \sqrt{r_{\gamma o}^2 + 2r_{\gamma o}\sin\beta_{jo}\cos\gamma_i \Delta X_{jk} + \Delta X_{jk}^2}$$

Thus, a time correction $\Delta \tau_{jk}$ depends upon five parameters $H_j$, $K_k$, $\gamma_j$, $\psi_j$ and V or their five combinations.

In a generated case, the predetermined point $A_{jr}$ located in the first (or second) normal section of the parabolic wavefront, i.e., $\gamma_j=0$, coinciding with the plane of incidence $E_H$ (i.e., $\psi_j=0$), the expression for a time delay is simplified to the form $$\Delta \tau_{jk} = = \left(\sqrt{r_{j1}^2 + 2r_{j1}\Delta X_{jk}\sin\beta_{\gamma o} + \Delta X_{jk}^2} - r_{j1}\right)/V_{jo}$$

Another case of simplification of the time correction formula may be applied under the following conditions $$(V_o^2 \Delta \tau_{jk}^2 / r_{j1} r_{j2}) << 1$$

Then the time correction is expressed in the form $$\Delta \tau_{jk} = \frac{\sqrt{[r_\gamma(\Delta X_{jk})]^2 + 2r_\gamma(\Delta X_{jk})\sin\beta_{jo}\Delta X_{jk} + \Delta X_{jk}^2} - r_{\gamma o}}{V(\gamma, \Delta X_{jk})}$$

where the quantity $$V(\gamma, \Delta X_{jk}) =$$

$$V_{jo} \cdot r_{\gamma o} \left[ 2H_j - K_j \sqrt{r_{\gamma o}^2 + 2r_{\gamma o}\sin\beta_{jo}\cos\gamma_o \Delta X_{jk} + \Delta X_{jk}^2} \right]$$

could be interpreted as the velocity of wave propagation, which depends on the azmuth $\gamma_{jo}$. This means that a reflected (or scattered) wave in a three-dimensional medium is mapped into an image in some specific anisotropic space and its properties depend on both geometrical characteristics of frictitious (or real) front, and the direction of an offset between a central point $A_{jo}$ and the predetermine point $A_{jk}$. Only in the cases wherein a wavefront is spherical, or in the above said degenerated cases when $(\psi=\gamma=0)$, the image plane is an isotropic one.

Thus, in the case of the MCRE method (and many other methods), a time delay is determined by the following so-called two-branch time correction formula $$\Delta \tau_k = \sum_{j=1}^{2} \Delta \tau_{jk} = \sum_{j=}^{2} (r_{jk} - r_{jo} + \Delta S_{ok})/V_{jo}$$

or by a two-term sum of any relations written for a specific type of a front caustic.

Common Converting Element (CCE) Imaging Technique

Figure 4B:
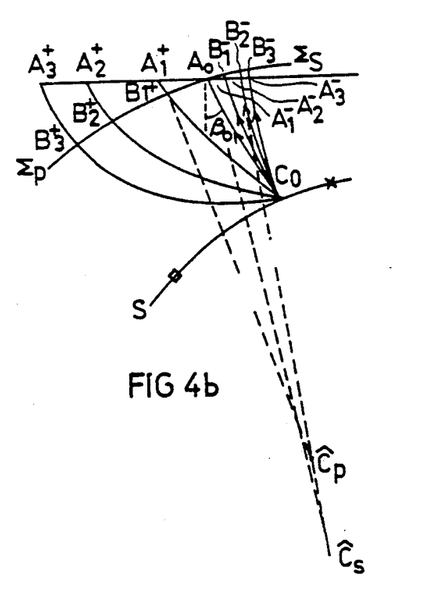
Figure 4C:
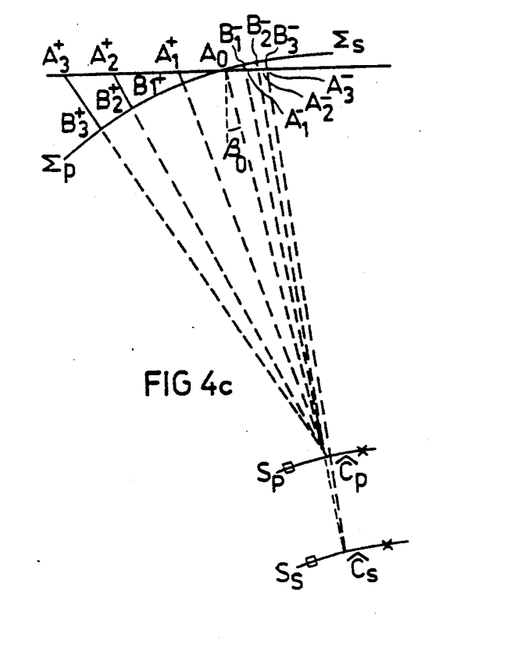

In a limiting case, while the first (source) line $Q_S$ and second (receiver) line $Q_r$ coincide, the two corresponding images $\hat{C}_{jo}$ and $\hat{C}_{ro}$ also coincide if monotype reflections take place. In case of common conversion, these two images are still different. The corresponding ray scheme is illustrated in FIGS. 4a–4c. Thus, FIG. 4a is a ray scheme corresponding to the CCE distribution of source-receiver pairs, FIG. 4b is a ray scheme corresponding to the frictions Snell's source located at the CCP, and FIG. 4c is a ray scheme corresponding to the P and S images of sources located at the centers $\hat{C}_p$ and $\hat{C}_s$ of the fronts curvature.

Sources $A_k^+$ of a P-wave, and receivers $A_k^-$ of an S-wave are distributed along line $A_k^+ A_o A_k^-$ in such a way all rays $A_k^+ C_o A_k^-$ have the common converting point $\hat{C}_o$, in which a frictions source is placed. This source radiates P- and S-waves at a different instance of time. The P and S fronts reach the central point at the same instant. A frictitious front, combined from the two parts corresponding to the P- and S-waves, is formed. The radius of curvature of the combined front has a discontinuity at the central point $A_o$. The centers of curvature (points $\hat{C}_p$ and $\hat{C}_s$) corresponding to the left and right sides are regarded as P and S images of the Common Converging Point (CCP). A related image plane is shown in FIG. 4c.

In this case, the two homeomorphisms $\hat{S}_p$ and $\hat{S}_s$ are constructed by a stack of converted events, using the following simplified form of the two-branch time corrections $$\Delta \tau_k = \left(\sqrt{r_p^2 + 2r_p\sin\beta_{PO}\Delta X_{PK} + \Delta X_{PK}^2} - r_p\right)/V_{OP} +$$

$$\left(\sqrt{r_s^2 + 2r_s\sin\beta_{SO}\Delta X_{SK} + \Delta X_{SK}^2} - r_s\right)/V_{OS}$$

where: $r_p$ and $r_s$ are the radii of wavefront curvature at the central point $A_{PO}$ and $A_{SO}$, $\beta_{PO}$ and $\beta_{SO}$ are angles of entry at this point, $v_{PO}$ and $v_{SO}$ are velocities of the S and P wave propagation at the central points The Common Evolute Element (CEE) Imaging Technique In certain cases of homeomorphic imaging, one branch time correction formula, containing only one term, may be used. An example is using the CEE imaging technique, when the used type of homeomorphic distribution is a so-called zero-offset distribution. That is, a source and a corresponding receiver of the stacked array placed approximately at the same point $A_K$, i.e., at the same point or nearby.

Figure 5A:
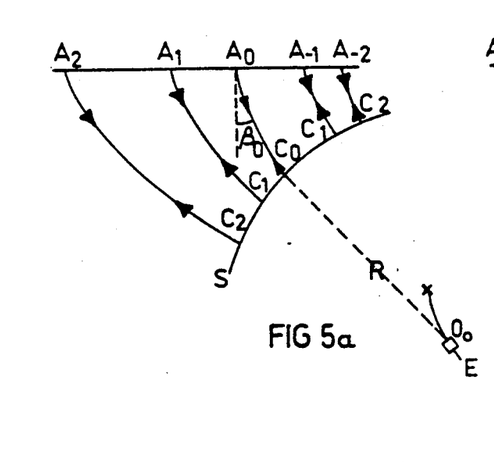
FIGS. 5a–5c are ray schemes illustrating the CEE imaging techniques.
Figure 5B:
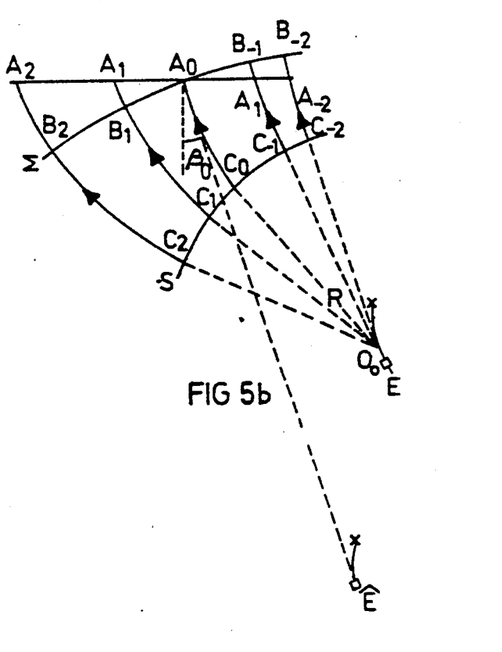
Figure 5C:
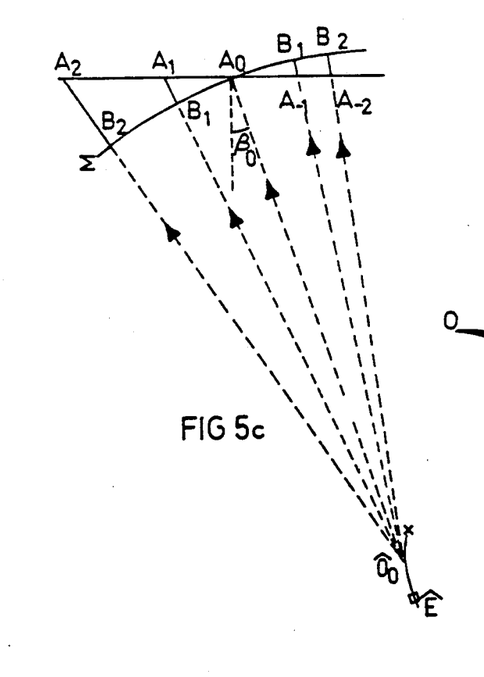

FIGS. 5a–5c are ray schemes illustrating the CEE imaging technique. FIG. 5a is a ray scheme corresponding to the CEE distribution of source-receiver pairs; FIG. 5b is a ray scheme corresponding to the fictitious source moving along a reflector evolute; and FIG. 5c is a ray scheme corresponding to the image of a source located on the front evolute (caustic).

In this technique, a moving fictitious source is placed on an element of a reflector evolute, i.e., a locus of centers of reflector curvature. The sources moving in such a way that an emitted fictitious front reaches a reflector at the instant $t_o=0$, and the central point $A_o$ of the array at the instant $t_o=t_c/2$. The element E of a front evolute (i.e., caustic) is considered as an image of the reflector evolute element E (or a reflector itself). The expression for time delay is a one-branch time correction $$\Delta \tau_k = 2(r_k - r_o + \Delta S_{ok})/V_o$$

whereas before $r_O$ and $r_K$ are radii of curvature of the front emitted by the moving fictitious source and intersecting at point $A_O$ and $A_K$, $\Delta \beta_{ok}$ is a length of a front caustic $\hat{A}_k \hat{C}_o$. In the case of a spherical fictitious front (i.e., the caustic shrinks to a point), the last expression takes the following simple form $$\Delta \tau_k = 2(\sqrt{r_o^2 + 2r_o \sin\beta_o \Delta X_k + \Delta X_k^2} - r_o)/V_o.$$

The Common Front Caustic Element (CFCE) Method

Another example of homeographic imaging, in which a one-branch time-correction is used, is the so-called Common Front Caustic Element (CFCE) method. The corresponding distributions of sources and receivers are the Common Source Point (CSP), or the Common Receiver Point (CRP) configurations, usually applied in the field. This technique may be based on any type of body waves, i.e., reflected, refracted, converted, diving, defracted or scattered.

Figure 6:
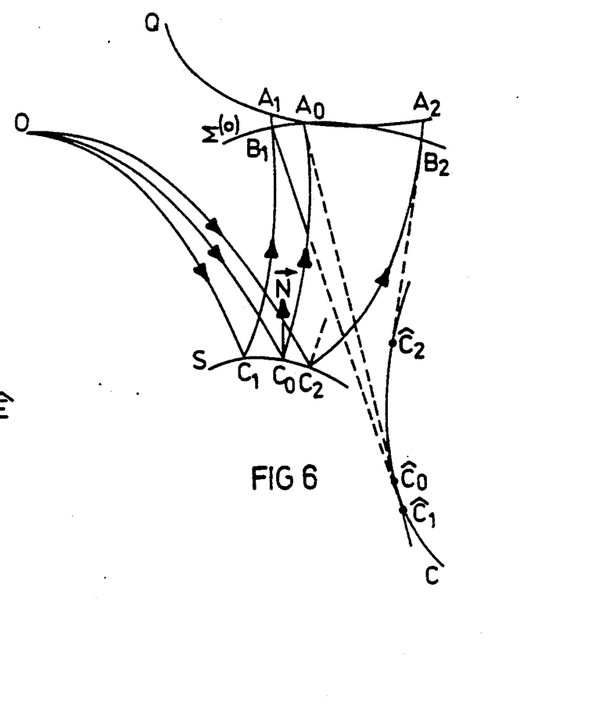
FIG. 6 is a ray scheme illustrating the CFCE imaging of reflected waves (the CSP configuration)
Figures 7, 8:
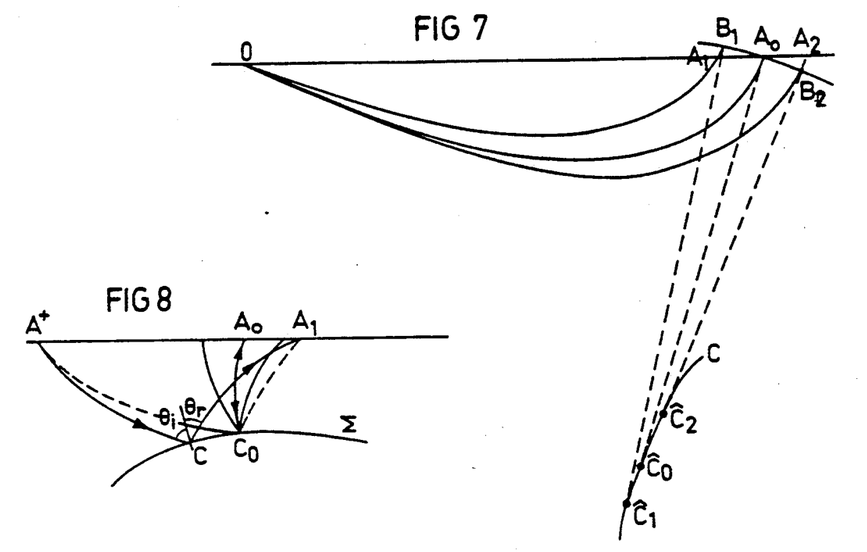
FIG. 7 is a ray scheme illustrating the CFCE imaging of diving waves (the CSP configuration)
FIG. 8 is a ray scheme illustrating calculations of additional terms in the time-correction formula, as will be described more particularly below.

FIG. 6 is a ray scheme illustrating the CFCE imaging technique of reflected waves based on the CSP configuration; and FIG. 7 is a ray scheme illustrating the CFCE technique of diving waves based on the CSP configuration. In FIG. 6, the source is located a the point "0" and the receivers being placed along line Q, the element $C_1$, $C_0$, $C_2$ of the reflector S is mapped into the image elements $\hat{C}_1$, $\hat{C}_0$, $\hat{C}_2$ on the evolute of the reflected front. In FIG. 7, each image element is $\hat{C}_o$, $\hat{C}_1$, etc.

According to this technique, an image point is a point of caustic of the fixed front propagated in the medium from a fixed common point to the distributed points $A_K$ (K=1,2,---), and corresponding to their central points $A_0$. The last two formula described with respect to the CEE imaging technique could be applied for calculating the time-delay correction, with two changes The first change is that the factor "2" before the brackets should be changed to "1". The second change is that the quantity $r_0$ in the formula would have the meaning of the radius of curvature of the front of a body wave actually propagated in the studied medium.

The Generalized Common Reflecting Element (GCRE) Technique

The same system of observation applied in the field could be used for constructing not one but several different types of homeomorphic images. These images could be found independently or simultaneously. There are certain variations of homeomorphic imaging in which two or more types of homeomorphism are constructed together, or are constructed after finding the first type, the later ones being determined by the aid of parameters of the first.

The Generalized Common Reflection Element (GCRE) method is described as an example of the combined scheme. In this method, the recorded traces are obtained by an arbitrary multifold system of observation. In the first stage, the CRE method scheme is performed, and part of the data is used for determining the CRE homeomorphism and its parameters. This means that the quantities radius of curvature of the fictitious front emitted at the CRP, the angle of entry $\beta_o$, and the correction asy-factor $\Delta \alpha$, are found for the fixed central point $A_o$ ($X_o$).

FIG. 8 is a ray scheme illustrating the calculation of additional terms in the time-correction formula, in which $A^+CA^-$ is a ray path from a source $A^+$ through a specular point C to a receiver $A^-$, $A_o$ is a central point of an array, $A_oC_o$ is a ray normal to a reflector S, and $A^+C_oA^-$ is the fictitious trajectory.

As shown in FIG. 8, in the second stage the events reflected from an element $\Delta S$ surrounding the CRP point $C_o$ are stacked by means of a so-called time-correction formula with an additional term which is determined by the expressions $$\Delta T_k = \tau(A_k^+ CA_k^-) - \tau(A_k^+ C_o A_k^-) =$$

$$-\frac{\alpha \cos^2 \beta_o}{4}\left(\frac{\Delta X_k^+}{r_k^+} + \frac{\Delta X_k^-}{r_k^-}\right) + \delta \tau_k,$$

where:

$$\delta \tau_k = \frac{\alpha \cos^2 \beta}{4}\left\{\left(\frac{\Delta X_k^+}{r_k^+} + \frac{\Delta X_k^-}{r_k^-}\right)\left[\left(\frac{\Delta X_k}{r_k^+}\right)^2 + \left(\frac{\Delta X_k^-}{r_k^-}\right)^2\right]\Delta\alpha - \left[\left(\frac{\Delta X_k^+}{r_k^+}\right)^2 + \left(\frac{\Delta X_k^-}{r_k^-}\right)^2\right]^2 \Delta\alpha^2\right\}$$

where: $\tau(A_k^+ CA_k^-)$ an arrival time along the geometrical ray $A_k^+ CA_k^-$ through a specular point C, $\tau(A_k^+ C_o A_k^-)$ is an arrival time of a wave defracted by the CRP point $C_o$, which have an image-point $\hat{C}_o$ with coordinates $$\hat{\xi}_o = X_o + r_o \sin\beta_o, \hat{\zeta}_o = r_o \cos\beta_o,$$

and $$\Delta X_k^+ = X_k^+ - X_o, \Delta X_k^- = X_k^- - X_o$$

$$r_k^+ = \hat{C}_o A_k^+ = \sqrt{(X_k^+ - \hat{\xi}_o)^2 + \hat{\zeta}_o^2},$$

$$r_k^- = \delta A_k^- = \sqrt{(X_k^- - \hat{\xi}_o)^2 + \hat{\zeta}_o^2}$$

The quantities d and $\Delta\alpha$ are parameters which are constants if a common reflecting point $C_o$ and its image $\hat{C}_o$ are fixed. In most cases of practical interest, the term $\delta \tau_k$ may be neglected.

Because of a large variety of combinations of types and receivers, and of distributions and waves, it is impossible to describe all variations of homographic imaging. However, if the types of distributions, waves and images of the object are predetermined, the corresponding homeomorphic imaging technique could be determined according to the general scheme and the specific examples thereof described above.

Homeomorphic Imaging Applied to other types of Waves

The above description described the body waves by the ray method, i.e., geometrical optics. However, homeomorphic imaging may be applied to other types of waves connected with defraction and/or scattering phenomena. Thus, the object, on which the geometrical optics body wave (reflected, refracted or converted) is formed, could be considered as a carrier consisting of oriented elements. Each element is oriented because Snell's law applies with respect to reflection, refraction or conversion. A scattering surface (or a point-like body) is considered as a carrier of non-oriented elements. An element of this type is non-oriented, because each incident ray generates a set of defracted (scattered) rays. The smooth interface with the edge is considered as a carrier of oriented elements with a frontier, the last is a set of non-oriented elements in a two-dimensional medium, or a set of elements of special orientation in a three-dimension medium.

Figure 9A:
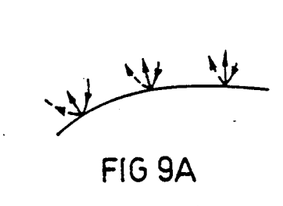
FIGS. 9a–9c illustrate three types of objects considered in homeomorphic imaging, namely a reflector carrier of oriented elements (FIG. 9a), a reflector whose edge is a carrier of non-oriented elements (FIG. 9b), and a scattering interface (fractal) is a carrier of non-oriented elements (FIG. 9c)
Figure 9B:
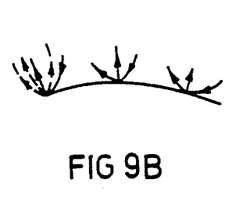
Figure 9C:
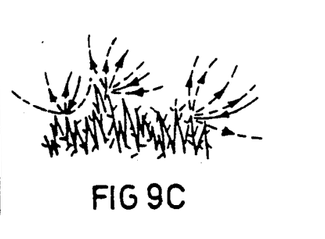

FIGS. 9a-9b illustrate these three types of objects considered in homeomorphic imaging. Thus, in FIG. 9a, a reflector is a carrier of oriented elements; in FIG. 9b, a reflector with an edge is a carrier of oriented elements with a frontier which is a carrier of non-oriented elements; and in FIG. 9c, a scattering interface (fractal) is a carrier of non-oriented elements.

Because for carriers of non-oriented elements, the first and second derivates do not exist, Snell's law is not applicable for such elements. Thus, a case of a common non-oriented element, i.e., for the Common Scattering Element ($CS_CE$) or Common Defracted Element (CDE), any type of distributions of sources and receivers, are acceptable for a homeomorphic stack; and all types of radii of curvature of wavefronts, determined by different variations of homeomorphic imaging, are approximately equal to the radius of a fictitious front determined by the CRE method. More precisely, all common elements determined by different types of homeomorphic images for a scattering interface are located in the same zone in an image plane.

Other differences between homeomorphic images of reflector type objects and scatter or defractor type objects are connected with a choice of optimal wavefield characteristics. In the case of a scattered or defracted wave, there is a difference between so-called phase and group velocities. These types of velocities are equal by simple type of body wave, like a reflected one. Therefore, so-called normalized wavefield and perigrams are optimal wavefield characteristics for a stack in order to distinguish simple body waves from scattered or defracted waves.

The above-mentioned features of different types of body waves provide a basis for identifyers of the type of objects according to their homeomorphisms, as follows:

For a reflector, there is an optimal value $\alpha$ of asy-factor in the CRE method; the phase ($v_{ph}$) and group ($v_{gc}$) velocities, determined from time-correction, are equal; the radii of curvature of wavefronts, determined by different types of homeomorphic imaging, are not equal.

For a scatterer-type object, all values of the asy-factor are optimal; the phase and group philosophies are not equal ($v_{ph} \neq v_{gr}$); and radii of curvature, determined by different types of homeomorphic imaging, are approximately equal.

For a diffractor-type object, there is an optimal range of the asy-factor values; the phase and group velocities are equal for all elements, except frontier elements for which the phase and group velocities are not equal; the radii of curvature of the mentioned fronts are approximately the same.

The following system of simple criteria (indicators) may be used for determining homeomorphism belonging to the same objects. For a predetermined central point $A_O(X_O)$, and the predetermined inteval of time $t_o$, the angles of entry of wavefronts $\beta_o$, the average values of stacked chosen wavefield characteristics should not change for different types of homeomorphic images.

Inverse Scheme of Homeomorphic Imaging

In seismic prospecting, as well as in many other areas of wave propagation applications, the model of overburden is unknown, or it is known with insufficient accuracy; therefore, the optimal values of parameters, needed for homeomorphic stacks, are unknown. In addition, the implementation of the certain types of sources and receivers distributions, depending on a recording time, is also impossible. Therefore, special processing of signals, recorded in the field, should be performed for finding the optimal values, or better to say, to solve some kind of an inverse problem of homeomorphic stack. This is formulated as a problem of optimal correlation, to find some type of homeomorphic stack and corresponding optimal parameters of sources and receivers distribution and time delay correction of a fixed type, which provides a maximum of chosen coherence measures.

General Scheme of Homeomorphic Stack and Imaging

Figure 10:
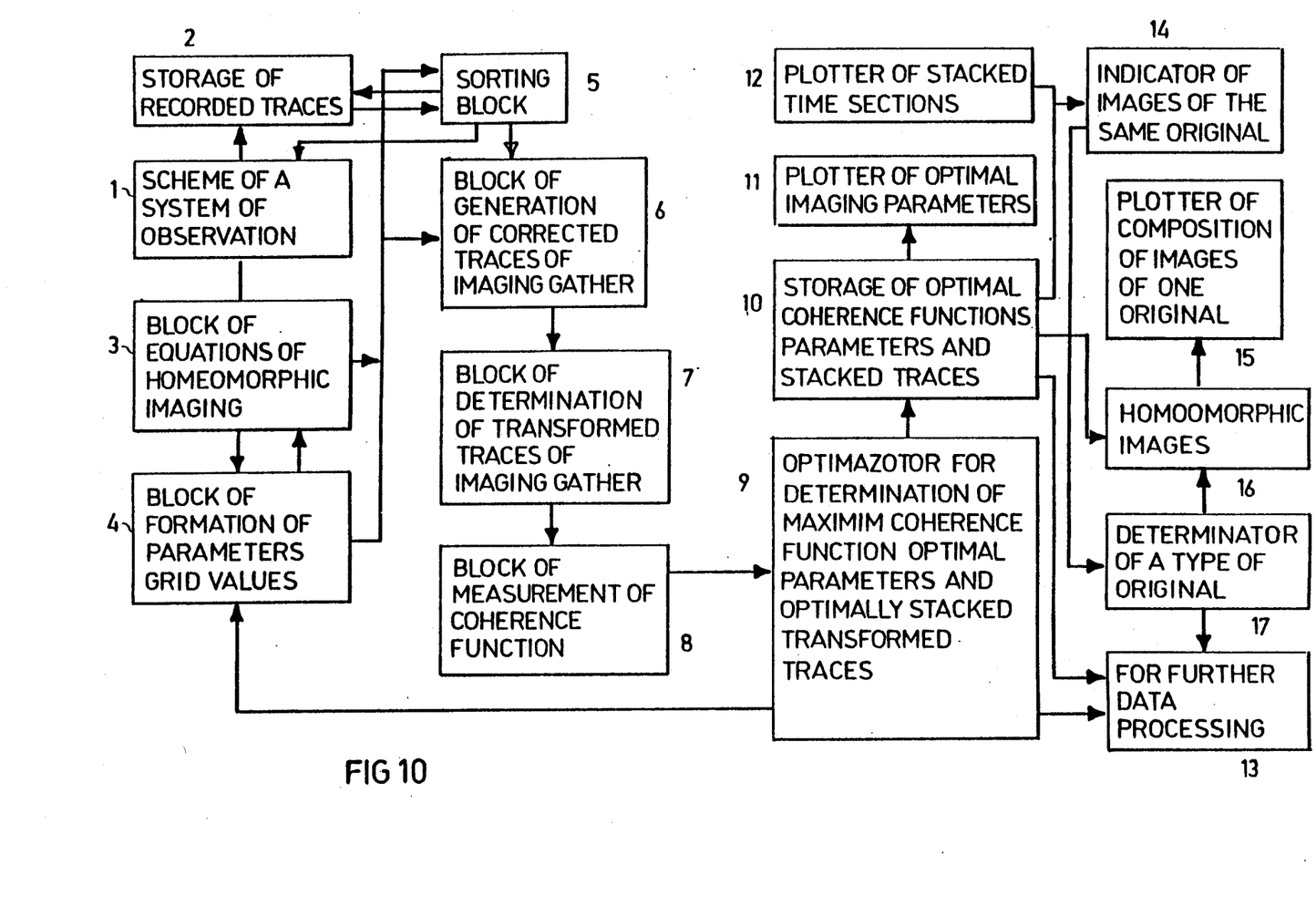
FIG. 10 is a block diagram illustrating a general scheme for determination of homeomorphic images in accordance with the present invention.

The general scheme of homeomorphic stack and imaging is shown in FIG. 10. This scheme is intended not only for inverse problems, but also for situations corresponding to different schemes encountered in both seismic exploration, seismology, and some areas of tomography and non-destructive testing of a body.

A plurality of traces recorded "in situ" are stored in the block 1. The parameters of the distributions of the sources and receivers are stored in block 2. Block 3 describes operations for determining types of homeomorphic imaging, i.e., possible types of distributions, time correction and image, in accordance with the above equations. Block 4 stores the sequences of grid values of the parameters of the equations, concerning a corresponding type of homeomorphic imaging. Block 4 also forms sets of predetermined combinations of the fixed grid values, and sends them successively to the sorting block 5. One of the predetermined combinations is fed to block 5 during each cycle.

Block 6 indicates the generation of corrected traces of the imaging gather. For performing this fuction, block 6 receives the selected recorded traces from block 2, via block 5, and also receives the combination of formation parameters of grid values from block 4.

In block 7 the chosen wavefield characteristic (e.g., so-called envelopes and normalized seismographs) are formed from traces of imaging gather. The traces of these characteristics are sent to block 8, in which the coherence function of a predetermined type are measured for each predetermined combination of fixed grid values.

These sets of coherent functions are entered into an optimizator (block 9) for determining their maximum at each moment of time, and the corresponding optimal parameters and optimally stacked transformed traces.

The latter are stored (block 10), and fed to a plotter of optimal imaging parameters (block 11), to a plotter of stacked time sections (block 12), and to a plotter of homeormorphic images (block 16). The maximum coherence function, optimal parameters, and optimally stacked transformed traces from block 9 are also fed for further processing (block 13).

Another way to use optimal parameters and images is to send them from block 10 to block 14, in which images belonging to the same original were selected and fed to the plotters 15.

Block 17 determines the type of object, for which images were selected in block 14, and sends it for further processing in block 13. The pictures plotted in blocks 11, 12, 15 and 16 could be used for direct physical interpretation.

Images for Three Types of Interfaces

Figure 11A:
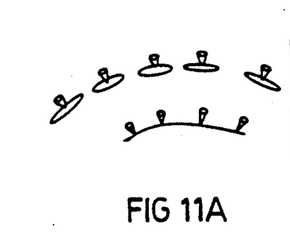
FIGS. 11a–11c illustrate the composition of CRE, CEE and CFCE images for three types of interfaces.
Figure 11B:
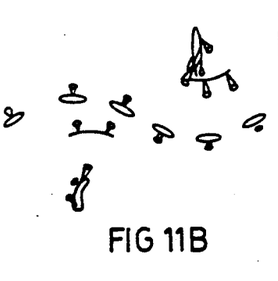
Figure 11C:
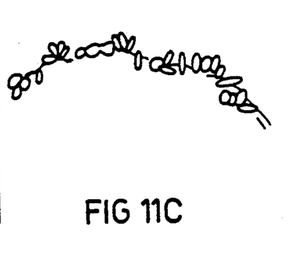

FIG. 11 illustrates the composition of the CRE, CEE and CFCE images for three types of interfaces, namely: (a) a smooth reflector interface, (b) a slightly undulated interface and (c) a scattering (fractal) interface. Each shaded area within a white cone corresponds to an oriented CRE element. A set of such elements forms a CRE image of studied object. A white area with a plurality of black cones is a CEE image; and a solid line with cones corresponds to a CFCE image. Each shaded (or white) area without cones represents a non-oriented CScE (or CEE) element.

Overburden in all three cases is homeogeneous. Thus, a CRE (or CScE) image is considered with an original. The direction of normal to interface is determined by a cone to the corresponding element. It follows from consideration of the CRE (or CScE) images, average surfaces of all three objects are closed and coincide in some points. However, the presented compositions of the three types of images are remarkably different.

This example illustrates known fundamental topological concepts. A complete comprehensive description of the object should be based on combined considerations of an original and its homeomorphisms. In the described examples, coordinates of a smooth reflector and fractal are close. It is difficult (sometimes impossible) to distinguish them on the basis of discrete studies (e.g., using only data of well drillings). However, their homeomorphic images, especially their combinations, are quite different. This means that with the help of homeomorphic imaging, it is possible to study the degree of smoothness or continuity of seismic objects.

This example also supports the conclusion that there is reason for expect from applications of homeomorphic images not only achievement of higher resolution and reliability, as compared with traditional techniques, but also extraction of new types of information concerning a structure of a studied medium.

While the invention has been described with respect to several preferred embodiments, it will be appreciated that many other variations, modifications and applications of the invention may be made.

What is claimed is:

1. A method of analyzing the structure of a medium by means of body waves transmitted through the medium, comprising:
   (a) generating seismic data represented by recorded traces corresponding to a plurality of source and receivers distributed with respect to predetermined central points according to a homeomorphic distribution which is necessary to produce a homeomorphic image, namely an image having a one-to-one correspondence between each element of the target and each element of its image;
   (b) forming from said recorded traces a gather of corrected traces corresponding to chosen wavefield characteristics corrected according to a predetermined time delay which depends on local parameters of the medium and wavefronts in the areas of the locations of the sources and receivers and which is necessary to produce a homeomorphic image;
   (c) stacking said corrected traces and obtaining stacked wavefield characteristics as functions of the time ($t_c$) of registration of the data on a predetermined central trace, corresponding to said central points;
   (d) repeating steps (a) and (b), and determining sets of stacked wavefield characteristics for a plurality of central traces; and
   (e) utilizing said sets of stacked wavefield characteristics and said predetermined parameters for determining the structure of the medium.

2. The method according to claim 1, wherein said predetermined parameters of said distribution and time correction are optimal parameters which provide one-to-one mapping.

3. The method according to claim 1, including the further step, following step (d), of producing graphs of said sets of stacked wavefield characteristics, called time sections and images of said objects, having coordinates depending on said optimal parameters.

4. The method according to claim 2, wherein:
   step (a) is performed by distributing the sources and receivers in the field according to the predetermined optimal common source point (CSP), or common receiver point (CRP), or zero offset, one-dimensional or two-dimensional binomial distribution;
   and step (b) is performed according to predetermined optimal and single-branch or two-branch local time correction at their generalized form.

5. The method according to claim 2, wherein:
   steps (a) and (b) are performed by distributing the sources and receivers in the field according to arbitrary distributions;
   and a plurality of synthetic corrected traces, called synthetic corrected gather, are generated from the recorded data by sorting, interpolating and correcting recorded traces according to the types of homeomorphic distributions and time corrections with optimal values of parameters.

6. The method according to claim 2, wherein:
   steps (a)-(c) are performed with traces recorded in the field by distributing sources and receivers in the field according to an arbitrary distribution;
   step (d) is performed by generating a variety of synthetic corrected gathers from the field recorded traces for different combinations of parameter values, taken from sequences of grid values;
   step (e) is performed by stacking corrected traces of each of said synthetic gather for each grid parameter combination and obtaining stacked wavefield characteristics as functions of said time ($t_c$) for said fixed central trace.

7. The method according to claim 6, including the further steps:
   (f) measuring chosen coherency criteria for each synthetic gather as a function of time ($t_c$) for the fixed central trace;

(g) optimizing the results of the coherency measurements at each instant of time ($t_c$) for the fixed central trace;

(h) determining the optimal parameters and optimally stacked wavefield characteristics corresponding to optimal values of coherency at each instant of time ($t_c$);

(i) repeating steps (d)–(h) to determine sets of maximum coherency functions and corresponding optimal values of said parameters and said wavefield characteristics for a plurality of said central traces; and (j) utilizing said sets of functions, parameters and characteristics for determining the structure of the medium.

8. The method according to claim 7, including the further steps: repeating steps (a)–(i) for determining sets of maxima of coherency functions and corresponding optimal parameters and optimally stacked time sections for other types of homeographic images consistent with the field distributions of sources and receivers; said sets of optimal parameters and optimal wavefield characteristics being utilized for determining the structure of the medium.

9. The method according to claim 8, including the further step, following step (j):

(k) finding homeomorphic images belonging to the same object using a system of predetermined indicators; and (l) determining the type of object from said homeomorphic images using predeter,oned criteria.

10. The method according to claim 1, called the Modified Common Relecting Element (MCRE) method, wherein step (a) is performed by distributing in the field the sources and receivers according to arbitrary distributions, and the two-dimensional binomial distribution of sources and receivers, and the two-branch corrections are predetermined as specific homeomorphic types of distributions and time corrections under conditions that all reflections and conversions take place at the same specular point, called the Common Reflecting Point (CRP) or the Common Converting Point (CCP).

11. The method according to claim 10, called the Generalized Common Relecting Element (GCRE) method, wherein:

(i) a first stage in which optimal parameters of said homeomorphic types of said distributions and time corrections are determined; and (ii) a second stage in which generalized time correction is applied under conditions that all reflections or conversions take place from an element of a reflector surrounding the CRP or CCP, according to the parameters determined in the first stage.

12. The method, called the Common Evolute Element (CEE) method, according to claim 1, wherein step (a) is performed by distributing each source and its corresponding receiver approximately at the same point and defining single-branch time-correction as said homeomorphic type of time delay under conditions that all rays are approximately normal to a reflector and an element of the caustic of the wavefront emitted by a fictitious source, located on an element of evolute of a reflector, is defined as an image of this evolute element.

13. The method, called the Common Front Caustic Element (CFCE) method, according to claim 1 wherein step (a) is performed by distributing arbitrary receivers or sources along a line in a two-dimensional medium or about an area in a three-dimensional medium, and fixing the location of the source or receiver such that the one branch time correction is predetermined as a specific type of homeomorphic correction under conditions that an element of a caustic of a body wave propagated in the medium is defined as an image of the studied objects.

14. The method according to claim 1, wherein said gather of corrected traces are generated from a plurality of recorded traces according to the following two-dimensional binomial distributions:

$$\Delta X_k = y_k + a_1 y_k^2$$

$$\Delta Z_k = -\gamma y_k + \gamma^2 d_2 y_k^2$$

$$(k = 0, 1, \ldots, M - 1)$$

wherein:

$\Delta X_k = X_k - X_o$ is the distance from the source (or receiver) $X_K$ to the corresponding central point $X_O$;

$\Delta Z_K = Z_k - Z_o$ is the distance from the receiver (or source)$_K$ to the other central point $Z_0$;

$a_j$ (j=1,2) is a predetermined coefficient of asymmetry, called the asy factor, which could be presented in a case of a two-dimensional medium by the expression:

$$a_j = a_{oj} + \Delta a_j,$$

$$a_{oj} = \sim \beta_{jo}/r_{oj} \, (j=1,2)$$

wherein $r_{oj}$ is the radius of curvature the wavefront emitted by a fictitious source, located at the CRP or the CCP and coming to one of said lines at an angle of entry $\beta_{jo}$;

$\Delta a_j$ is a predetermined correction coeficient of asymmetry;

M is the number of seismic traces;

$\gamma$ is a predetermined coefficient; and $y_k$ is an independent variable, which takes values predetermined sequence of numbers ($y_k$=0, 1, 2, . . . ).

15. The method according to claim 14, wherein the gather of corrected traces are generated from a plurality of recorded traces according to a predetermined distribution of one of the source-receiver pairs $\Delta X_K$ along one line and according to the following distribution of the other of the said pair along the second line $$\Delta Z_k = -\gamma y_k + (\gamma^2 a_2/a_1)(\Delta X_k - y_k)$$

$$y_k = (\sqrt{1 + 4a_1 \Delta X_k} - 1)/2a_1$$

wherein:

$\Delta X_K$ is a number from said predetermined distribution;

$a_j$ (j=1,2) and $\gamma$ are fixed coefficients.

16. The method according to claim 1, wherein the time delay in the case of a two-dimensional medium is effected according to the following relationship:

$$\Delta \tau_k = \delta \sum_{j=1}^{m} (r_{jk} + \Delta S_k - r_{jo})/V_{jo}$$

wherein:

$\Delta \tau_K$ is the time delay for the K-th trace relatively to the central trace;

$\delta = 1$, $m = 1$ in the case of time correction of two branches;

$m = 1$ in the case of time correction of one branch and $\delta = 2$ or $\delta = 1$ $r_{jk}(r_{jo})$ is the radius of a wavefront emitted by a source located at the common element and coming to the K-th (central) source or receiver placed on said j-th line, $\Delta S_K$ is the length of a caustic arc between centers of curvature, corresponding to the K-th and central points on the j-th line;

and $v_{jo}$ is the velocity of wave propagation on the reference level.

17. The method according to claim 1, wherein the time delay in the case of two-dimensional medium is effected according to the following relationships:

$$\Delta \tau_k = \delta \sum_{j=1}^{2} \frac{\sqrt{r_{jo}^2 + 2r_{jo}\Delta X_{jk}\sin\beta_{oj} + \Delta X_{jk}^2 + \rho_\gamma^2 + \rho_j\beta_j} + \rho_j\left(\Delta\beta_{jk} - tg\frac{\beta_{1k}}{2}\right) - r_{jo}}{V_{jo}}$$

wherein:

$\Delta X_k = \Delta X_k$, $\Delta X_{2k} = \Delta Z_k$ $tg\Delta\beta_{jk} = $ $$\frac{\beta_{jk}[\Delta X_{jk}\cos\beta_{jo} - \rho_j] \pm \rho_j \sqrt{r_{jo}^2 + 2\rho_j\Delta X_{jk}\cos\beta_{jo}}}{\beta_{jk}^2 - \rho_j^2}$$

$m$, $\delta$, $r_{jo}$, $v_{jo}$, $\Delta X_K$ and $\Delta Z_K$ are defined in claims 14 and 16;

$\rho_j$ is the radius of curvature of a circular caustic corresponding to the said j-th line;

$\beta_{jo}$ is the angle of entry of wavefront to the central point of the j-th line;

and the quantities $p_j$ and $\rho_j$ are defined by the following expressions:

$p_j = \rho_j tg(\beta_{jo}/2)$, $C_{jk} = r_{jo} + \Delta X_{jk} \sin \beta_{jo}$.

18. The method according to claim 1, wherein the time delay in the case of a two-dimensional medium is effected according to the following relationships:

$$\Delta \tau_k = \delta \sum_{j=1}^{m} \left[\sqrt{r_{jo}^2 + 2r_{jo}\Delta X_{jk}\sin\beta_{jo} + \Delta X_{jk}^2} + \frac{1}{2}\left(1 - \frac{\beta_j}{r_{jo}}\right)\rho\Delta\beta_{jk}\right]/V_{jo}$$

$$\Delta\beta_{jk} = \frac{\Delta X_{jk}\cos\beta_{jo}}{\beta_j}\left(1 - \frac{\rho_j}{\Delta X_{jk}\cos\beta_{jo}}\right) + \frac{r_{jo}}{\beta_{jk}}\rho_j$$

19. The method according to claim 1, wherein the time delay $\Delta t_K$ in the case of a two-dimensional medium is effected according to the following relationship, called a time correction with an additional term:

$\Delta \tau_k = \Delta \tau_K + \Delta T_K$ wherein: $\Delta \tau_K$ is a time delay and the additional term $\Delta T_K$ is defined by the following expressions:

$$\Delta T_k = -\frac{\alpha}{2}\left(\frac{\cos^2\beta_{1o}\Delta X_k}{r_{1k}} + \frac{\gamma\cos^2\beta_{2o}\Delta Z_k}{r_{2k}}\right)^2 +$$

$$\alpha\left(\frac{\cos^2\beta_{1o}\Delta X_k}{r_{1k}} + \frac{\gamma\cos^2\beta_{2o}\cdot\Delta Z_k}{r_{2k}}\right)\left[\Delta\alpha_1\left(\frac{\Delta X_k}{r_{1k}}\right)^2 - \Delta\alpha_2\left(\frac{\Delta Z}{r_{2k}}\right)^2\right]$$

wherein: d is a predetermined factor.

20. The method according to claim 1, wherein the time delay in the case of a three-dimensional medium is effected according to the following relationship:

$$\Delta \tau_l = \delta \sum_{j=1}^{2}\left\{\frac{-1}{2V_{jo}}\left[\frac{2H_j}{K_j} - r_\gamma(\Delta X_{jl})\right] + \frac{1}{V_{jo}}\sqrt{\frac{1}{4}\left[\frac{2H_j}{K_j} - r_\gamma(\Delta X_{jl})\right]^2 + \frac{r_\gamma(\Delta X_{jl}) - r_{\gamma o}}{K_j r_{\gamma o}}}\right\}$$

wherein: $\delta$ and $V_{jo}$ are defined in claims 16, $H_j$ and $K_j$ are the predetermined values of the average and gaussian curvature of said wavefront, coming to the j-th line at its central point, the quantity $r_\gamma(\Delta X_{je})$ is determined by the expression:

$$r_\gamma(\Delta X_{jl}) = \sqrt{r_{\gamma o}^2 + V_{\gamma o}\sin\beta_{jo}\cos\gamma_j\Delta X_{jl} + \Delta X_{jl}^2}$$

$$\frac{1}{r_{jo}} = \frac{\cos^2(\psi_j - \gamma_j)}{r_{j1}} + \frac{\sin^2(\psi_j - \gamma_j)}{r_{j2}}$$

where:

$$\frac{1}{r_{j1}} = H_j + \sqrt{H_j^2 - K_j^2}, \frac{1}{r_{j2}} = -H_j + \sqrt{H_j^2 - K_j^2}$$

$\psi_j$ and $\gamma_j$ are predetermined quantities representing the angles between a plane of incidents $E_{nj}$ of said wavefront and its first principal normal section or the normal section corresponding to offset $\Delta X_{je}$.

21. The method according to claim 1, wherein the time delay in the case of a three-dimensional medium is effected according to the following expression:

$$\Delta \tau_l = -\delta \sum_{j=1}^{2} [r_j(\Delta X_{jl}) - r_{jo}]/\frac{V}{2}(\gamma_j, \Delta X_{jl})$$

where:

$V(\delta_j, \Delta X_{je}) = v_{jo} r_{jo}[2H_j - K_j r_j(\Delta X_{je})]$.

22. The method according to claim 1, wherein the system of object indicators intended for determination of said images belonging to the same object is effected according to the following unqualities:

$$|\beta_{jo}^I(X_{jo}, t_o) - \beta_{jo}^{II}(X_{jo}, t_o)| < \delta\beta$$

$$|W_I(X_{jo}, t_o) - W_{II}(X_{jo}, t_o)| < \delta W, \ W_m > \delta W (m = \text{I or II})$$

$$|M_I(X_{jo}, t_o) - M_{II}(X_{jo}, t_o)| < \delta M$$

where: $M_I(X_{jo}, t_o)$ and $M_{II}(X_{jo}, t_o)$ are optimal values of the fixed wavefield characteristics determined for two compared images in the same central point $X_{jo}$ and in the same moment $t_o$, $\beta_{oj}$ and $\beta_{oj}$ are angles of entry determined by two compared methods, $W_I$ and $W_I$ are maximum values of coherence functions determined by two compared methods, and $\delta\beta$, $\delta W$ and $\delta M$ are determined threshold numbers.

23. The method according to claim 1, applied to seismic prospecting of deep seismic sounding or seismology, wherein the said recorded traces are seismic traces.

24. The method according to claim 1, applied to tomographic or non-destructive testing of a body, wherein the recorded traces are produced by sonic or electromagnetic waves applied to the studied medium.

* * * * *